United States Patent
Lin et al.

(10) Patent No.: US 11,841,573 B2
(45) Date of Patent: Dec. 12, 2023

(54) MASK PLATE GROUP AND DISPLAY PANEL

(71) Applicant: AU Optronics (Kunshan) Co., Ltd., Kunshan (CN)

(72) Inventors: Ken Ching Lin, Kunshan (CN); Po-Chun Chiu, Kunshan (CN)

(73) Assignee: AU OPTRONICS (KUNSHAN) CO., LTD., Kunshan (CN)

( * ) Notice: Subject to any disclaimer, the term of this patent is extended or adjusted under 35 U.S.C. 154(b) by 951 days.

(21) Appl. No.: 16/645,202

(22) PCT Filed: Nov. 13, 2018

(86) PCT No.: PCT/CN2018/115230
§ 371 (c)(1),
(2) Date: Mar. 6, 2020

(87) PCT Pub. No.: WO2020/052048
PCT Pub. Date: Mar. 19, 2020

(65) Prior Publication Data
US 2023/0251520 A1    Aug. 10, 2023

(30) Foreign Application Priority Data
Sep. 12, 2018 (CN) .......................... 201811061442.1

(51) Int. Cl.
*G02F 1/1335* (2006.01)
(52) U.S. Cl.
CPC .. *G02F 1/133516* (2013.01); *G02F 1/133512* (2013.01); *G02F 1/133514* (2013.01)

(58) Field of Classification Search
CPC ......... G02F 1/133514; G02F 1/133516; G02B 5/201
See application file for complete search history.

(56) References Cited

U.S. PATENT DOCUMENTS

| | | | |
|---|---|---|---|
| 5,399,450 A * | 3/1995 | Matsushima | G02F 1/133516 430/7 |
| 6,280,890 B1 * | 8/2001 | Sawamura | G02F 1/133514 430/7 |

(Continued)

FOREIGN PATENT DOCUMENTS

| | | |
|---|---|---|
| CN | 103018950 B | 2/2015 |
| CN | 106908985 A | 6/2017 |

(Continued)

*Primary Examiner* — Alexander P Gross
(74) *Attorney, Agent, or Firm* — WPAT, P.C.

(57) ABSTRACT

The invention relates to a display panel, comprising a first substrate; a second substrate comprising a color resist layer, the color resist layer comprising a first color resist, a second color resist and a third color resist sequentially arranged in a first direction; and a display molecular layer disposed between the first substrate and the second substrate; wherein, in a second direction perpendicular to the first direction, the first color resist comprises a plurality of first color resist stripes, the second color resist comprises at least one second color resist stripe, the third color resist comprises at least one third color resist stripe, and a volume of the first color resist stripe is smaller than a volume of the second color resist stripe and smaller than a volume of the third color resist stripe, wherein the first color resist is a green color resist.

15 Claims, 4 Drawing Sheets

(56) References Cited

U.S. PATENT DOCUMENTS

| | | | |
|---|---|---|---|
| 8,767,324 B2 | 7/2014 | Matsui et al. | |
| 8,778,576 B2 | 7/2014 | Matsui et al. | |
| 2005/0142466 A1* | 6/2005 | Tsubata | G02B 5/201 430/7 |
| 2015/0192826 A1* | 7/2015 | Lin | G02B 5/201 359/891 |
| 2015/0309221 A1* | 10/2015 | Li | G02B 5/201 359/891 |
| 2017/0192143 A1 | 7/2017 | Xiong et al. | |
| 2017/0315390 A1* | 11/2017 | Nakagawa | G02F 1/1339 |
| 2019/0056625 A1 | 2/2019 | Li | |

FOREIGN PATENT DOCUMENTS

| | | |
|---|---|---|
| CN | 107402469 A | 11/2017 |
| CN | 108508695 A | 9/2018 |

\* cited by examiner

MASK PLATE GROUP AND DISPLAY PANEL

TECHNICAL FIELD

The disclosure relates to display panel manufacture, and more particularly, to a mask plate group for manufacturing a display panel.

BACKGROUND ART

Currently, products using AHVA (Advanced Hyper-Viewing Angle) technology are quite common. In design of AHVA display panel, the color filter substrate uses color resists having stripe type patterns, and achieves different resolutions by designing the color resists to have strip type patterns of different widths.

The AHVA liquid crystal display panels have various resolutions. In design of the AHVA liquid crystal display panel, the color resists of the color filter substrate have stripe type patterns, and the color resists of the color filter substrates for the products with different resolutions have different widths. Generally, a width of color resist pattern is 20 to 50 μm based the product resolution (such as, 4K/2K, FHD, QHD, etc.). A proximity exposure machine used in a production line of the AHVA liquid crystal display panel has an illumination of about 40 to 60 mw/cm$^2$ during the manufacturing process of the color filter substrate. With increase of the product resolution, the width of the color resist pattern of the color filter substrate becomes narrower, and alignment accuracy in the manufacturing process of the color filter substrate needs to be improved, so a projection exposure machine is used in certain product line, which has an illumination of about 700 mw/cm$^2$ during the manufacturing process of the color filter substrate. The projection exposure machine shortens an exposure time and improves accuracy, thereby improving production efficiency and yield. However, on the other hand, since the projection exposure machine has a larger output energy and a shorter illumination time of UV rays as compared with the proximity exposure machine, the levels of crosslinking on upper and lower surfaces of the color resist film formed by the photo resist are different. The crosslinking level on the upper surface of the color resist film is higher and the film is harder, while the crosslinking level on the lower surface of the color resist film is lower and the film is softer, so the thermal shrinkages of the color resists during the oven process are different, which results in the protrusions on the surface of the color resist film and the generation of wrinkles larger than an error margin, thereby increasing instability of the manufacturing process of the color filter substrate.

DISCLOSURE OF THE PRESENT INVENTION

With respect to the above issues, the embodiment of the invention relates to a display panel, comprising: a first substrate; a second substrate comprising a color resist layer, the color resist layer comprising a first color resist, a second color resist and a third color resist sequentially arranged in a first direction; and a display molecular layer disposed between the first substrate and the second substrate; wherein, in a second direction perpendicular to the first direction, the first color resist comprises a plurality of first color resist stripes, the second color resist comprises at least one second color resist stripe, the third color resist comprises at least one third color resist stripe, and a volume the first color resist stripe is smaller than a volume of the second color resist stripe and smaller than a volume of the third color resist stripe, wherein the first color resist is a green color resist.

In the display panel according to the embodiment of the invention, the volume of the first color resist stripe is smaller than or equal to 270,000 μm$^3$.

In the display panel according to the embodiment of the invention, in the second direction, the second color resist comprises a plurality of second color resist stripes, and the third color resist comprises a plurality of third color resist stripes, a number of the first color resist stripes is larger than a number of the second color resist stripes, and the number of the first color resist stripes is larger than a number of the third color resist stripes.

In the display panel according to the embodiment of the invention, an area of the first color resist stripe is smaller than or equal to 98,000 μm$^2$.

In the display panel according to the embodiment of the invention, the volume of the second color resist stripe is smaller than or equal to the volume of the third color resist stripe, the second color resist is a blue color resist, and the third color resist is a red color resist.

In the display panel according to the embodiment of the invention, the second color resist is a blue color resist, and the volume of the second color resist is smaller than or equal to 290,000 μm$^3$.

In the display panel according to the embodiment of the invention, the third color resist is a red color resist, and the volume of the third color resist is smaller than or equal to 310,000 μm$^3$.

The display panel according to the embodiment of the invention further comprises a light shielding layer disposed on the second substrate and comprising a plurality of first light shielding stripes each extending in the first direction, and a plurality of second light shielding stripes each extending in the second direction and crossing with the first light shielding stripes, wherein the second light shielding stripes are positioned between the first color resist and the second color resist, between the second color resist and the third color resist, and between the third color resist and the first color resist, respectively.

In the display panel according to the embodiment of the invention, one of the plurality of first light shielding stripes is completely covered by a first color resist layer, and another one of the plurality of first light shielding stripes is partially covered or uncovered by the first color resist layer.

The embodiment of the invention further relates to a mask plate group for manufacturing a display panel, the display panel comprising a first substrate, a second substrate and a display molecular layer disposed between the first substrate and the second substrate, wherein the second substrate comprises a color resist layer comprising a first color resist, a second color resist and a third color resist sequentially and uniformly arranged in a first direction, the first color resist comprises a plurality of first color resist stripes, the second color resist comprises at least one second color resist stripe, the third color resist comprises at least one third color resist stripe, and the first color resist is a green color resist; the mask plate group comprises a first mask plate comprising a first mask pattern for patterning and forming the first color resist stripes, a second mask plate comprising a second mask pattern for patterning and forming the second color resist stripe, and a third mask plate comprising a third mask pattern for patterning and forming the third color resist strip; wherein an area of the first mask pattern is smaller than an area of the second mask pattern, and the area of the first mask pattern is smaller than an area of the third mask pattern.

In the mask plate group according to the embodiment of the invention, the area of the first mask pattern is smaller than or equal to 98,000 μm².

In the mask plate group according to the embodiment of the invention, each of the first mask pattern, the second mask pattern and the third mask pattern has a width between 20 to 60 μm in the first direction.

In the mask plate group according to the embodiment of the invention, the area of the second mask pattern is smaller than or equal to the area of the third mask pattern, and the second color resist is a blue color resist.

In the mask plate group according to the embodiment of the invention, the first color resist formed by the first mask pattern has an area between 93,000±5,000 μm², the second color resist formed by the second mask pattern has an area between 95,000±5,000 μm², and the third color resist formed by the third mask pattern has an area between 97,000±5,000 μm².

In the mask plate group according to the embodiment of the invention, the first color resist stripe formed by the first mask pattern has a volume between 260,000±10,000 μm³, the second color resist stripe formed by the second mask pattern has a volume between 280,000±10,000 μm³, and the third color resist stripe formed by the third mask pattern has a volume between 300,000±10,000 μm³.

REFERENCE SIGNS IN THE DRAWINGS

10: first substrate
100: color resist layer
120: light shielding layer
121: first light shielding strip
122: second light shielding strip
130: substrate
101: first color resist
102: second color resist
103: third color resist
111: first color resist strip
112: second color resist strip
113: third color resist strip
X: first direction
Y: second direction

DETAILED DESCRIPTION OF THE EXEMPLARY EMBODIMENTS

Hereinafter, the embodiments of the invention will be explained in detail with reference to the drawings such that the objects, features and advantages of the invention can be apparent and easy to understand. Many specific details will be explained below to facilitate fully understanding of the invention. However, the invention can be implemented in other ways different from the described embodiments, and those skilled in the art can make similar improvements without departing from the essence of the invention, so the invention is not limited to the embodiments disclosed below.

In the embodiments of the invention, the protrusions on the surface of the color resist film are reduced by reducing thermal stress inside the color resist, such that the wrinkles on the surface of the color resist film are limited within a range of the error margin. Specifically, when the volume and the area of the color resist are increased, the thermal stress accumulated inside the color resist will be increased. The thermal stress accumulated inside the color resist can be controlled within a certain range by reducing the volume of the color resist to reduce the wrinkle on the surface of the color resist film, such that the flatness of the color resist stripe satisfies the requirement for the error margin. In addition, the differences between crosslinking levels on the upper and lower surfaces are different for color resists of different colors due to the differences in characteristics of the color resist materials, so the thermal stresses accumulated inside the color resists of different colors in the oven process are different. For example, when the volume of the color resists are same and the original exposure quantity are same, the thermal stress accumulated inside the blue color resist is larger than the thermal stress accumulated inside the red color resist, and smaller than the thermal stress accumulated inside the green color resist, so the wrinkle issue occurring in the green color resist is severer than the wrinkle issue occurring in the blue color resist and the wrinkle issue occurring in the red color resist. Therefore, the internal thermal stresses inside the resist materials of different colors are different, and the wrinkles on the surface of the color resist film should be reduced separately for the resist materials of different colors.

Figure 1:
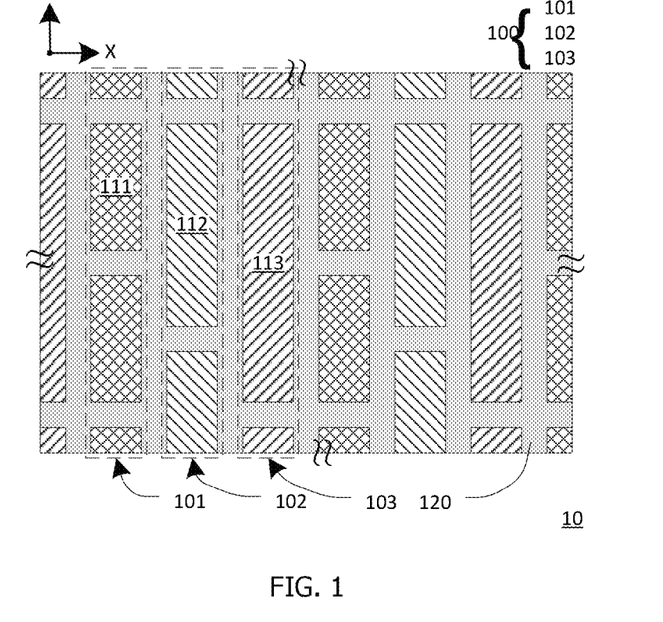
FIG. 1 is a top view of a color filter substrate of a display panel according to a first embodiment of the invention.

FIG. 1 is a top view of a color filter substrate of a display panel according to a first embodiment of the invention. As shown in FIG. 1, the display panel comprises a first substrate (such as a TFT substrate), a second substrate (such as a color filter substrate) 10 and a display molecular layer disposed between the first substrate and the second substrate 10. The first substrate and the display molecular layer are omitted for clarity. The second substrate 10 comprises a color resist layer 100, a light shielding layer 120 and a substrate 130. The color resist layer 100 comprises a first color resist (such as a green color resist) 101, a second color resist (such as a blue color resist) 102 and a third color resist (such as a red color resist) 103, but the invention is not limited thereto. In another example, the color resist layer 100 is formed of a color resist material having a single color or multiple colors.

In this embodiment, in a first direction X, the first color resist 101, the second color resist 102 and the third color resist 103 are sequentially arranged. In a second direction Y, the first color resist 101 is divided into a plurality of first color resist stripes 111, the second color resist 102 is divided into a plurality of second color resist stripes 112, and the third color resist 103 is divided into a plurality of third color resist stripes 113. The numbers of the first color resist stripes 111, the second color resist stripes 112 and the third color resist stripes 113 are not same. The number of the first color resist stripes 111 is larger than the number of the second color resist stripes 112, the number of the second color resist stripes 112 is larger than the number of the third color resist stripes 113, which is suitable for products having various color saturations (NTSC). In this embodiment, when the first color resist 101 is a green color resist, the second color resist 102 is a blue color resist, and the third color resist 103 is a red color resist, a volume of the first color resist stripe 111 is smaller than or equal to 270,000 μm³ according to characteristics of different color resist materials in order to control an offset of the wrinkle of the color resist within a range of the error margin.

Figure 2A:
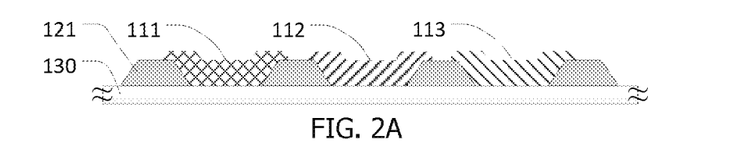
FIG. 2A is a sectional view along an X direction in FIG. 1.
Figure 2B:
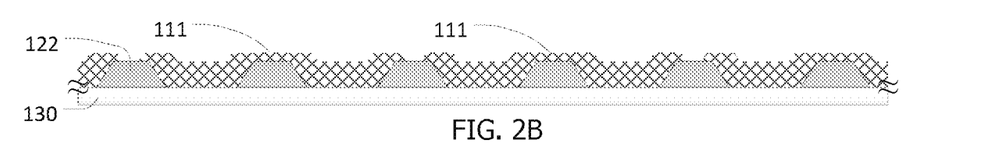
FIG. 2B is a sectional view of a first color resist along a Y direction in FIG. 1.
Figure 2C:
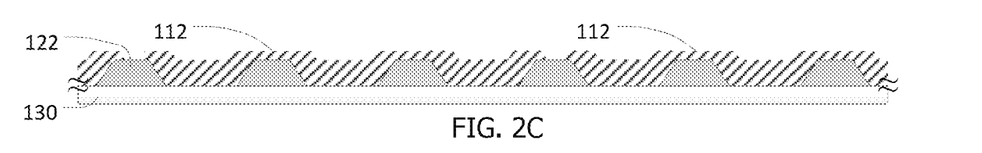
FIG. 2C is a sectional view of a second color resist along the Y direction in FIG. 1.
Figure 2D:
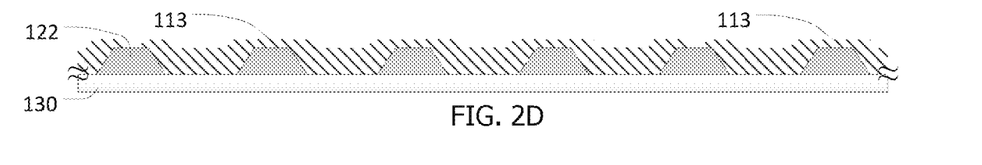
FIG. 2D is a sectional view of a third color resist along the Y direction in FIG. 1.

FIG. 2A is a sectional view along an X direction in FIG. 1, FIG. 2B is a sectional view of a first color resist along a Y direction in FIG. 1, FIG. 2C is a sectional view of a second color resist along the Y direction in FIG. 1, and FIG. 2D is a sectional view of a third color resist along the Y direction in FIG. 1. Referring to each of FIG. 1 to FIG. 2D, the light shielding layer 120 of this embodiment comprises a plurality of first light shielding stripes 121, and a plurality of second light shielding stripes 122 crossing with the first light shielding stripes 121, respectively. Specifically, the first light shielding stripes 121 extend in the second direction Y, and the second light shielding stripes 122 extend in the first direction X. As shown in FIG. 2A, in the X direction, the first light shielding stripes 121 separate the first color resist 101 (the first color resist stripes 111), the second color resist 102 (the second color resist stripes 112) and the third color resist 103 (the third color resist stripes 113) from each other, and the first light shielding stripes 121 are covered by the first color resist stripes 111, the second color resist stripes 112 or the third color resist stripes 113, respectively. Specifically, in this embodiment, the first light shielding stripes 121 are disposed on the substrate 130, and then the first color resist 101, the second color resist 102 and the third color resist 103 are sequentially or simultaneously formed on the substrate 130. In such a case, each of the first color resist 101, the second color resist 102 and the third color resist 103 covers the light shielding stripes 121, such that the respective color resists can be separated by the light shielding stripes 121 without interference.

Referring to FIG. 2B, which is a sectional view of a first color resist along a Y direction in FIG. 1, the first color resist 101 is formed on the substrate 103 by patterning the plurality of first color resist stripes 111, such that in the Y direction, a portion of the second light shielding stripes 122 is completely covered by the first color resist stripes 111, and another portion of the second light shielding stripes 122 is partially covered or uncovered by the first color resist stripes 111. In other words, a portion of the second light shielding stripes 122, which is not completely covered by the first color resist stripes 111, is positioned between two adjacent first color resist stripes 111 to separate the two adjacent first color resist stripes 111. In such a way, the volume of each of the first color resist stripes 111 is smaller than the volume of the first color resist 101 formed as a single strip according to the prior art by forming the first color resist 101 as a plurality of first color resist stripes 111 on the substrate 130 in a process for patterning the first color resist 101. Therefore, in an exposure process for each of the first color resist stripes 111, the thermal stress accumulated inside the first color resist stripe 111 is relatively small, such that the phenomenon of wrinkle will not occur on the surface.

Similarly, as shown in FIG. 2C, the second color resist 102 is formed on the substrate 103 by patterning the plurality of second color resist stripes 112. Specifically, the volume of each of the second color resist stripes 112 is smaller than the volume of the second color resist 102 formed as a single strip according to the prior art by forming the second color resist 102 as a plurality of second color resist stripes 112 on the substrate 130 in a process for patterning the second color resist 102. Therefore, in an exposure process for each of the second color resist stripes 112, the thermal stress accumulated inside the second color resist stripe 112 is relatively small, such that the phenomenon of wrinkle will not occur on the surface. In addition, as shown in FIG. 2D, the third color resist 103 is formed on the substrate 130 by patterning the plurality of third color resist stripes 113. Therefore, the volume of each of the third color resist stripes 113 is smaller than the volume of the third color resist 103 formed as a single strip according to the prior art by forming the third color resist 103 as a plurality of third color resist stripes 113 on the substrate 130 in a process for patterning the third color resist 103. Therefore, in an exposure process for each of the third color resist stripes 113, the thermal stress accumulated inside the third color resist stripe is relatively small, such that the phenomenon of wrinkle will not occur on the surface.

Referring to each of FIG. 1 and FIG. 2B to FIG. 2D, in this embodiment, in the Y direction, a length of the first color resist stripe 111 is smaller than a length of the second color resist stripe 112, and the length of the second color resist stripe 112 is smaller than a length of the third color resist stripe 113. For example, the first color resist stripes 111 are green color resists, the second color resist stripes 112 are blue color resists, and the third color resist stripes 113 are red color resists. Specifically, since internal thermal stresses suffered or formed by different materials are different, in this embodiment, when the exposure conditions for the green color resist, the blue color resist and the red color resist are same, the wrinkles are more likely to be formed on the surface of the green color resist due to the internal thermal stress. In other words, in order to avoid occurrence of the wrinkle, the volume of the green color resist is smaller than the volume of the blue color resist and the volume of the red color resist, and the volume of the blue color resist is smaller than the volume of the red color resist. Therefore, as shown in FIG. 1, the volume of the first color resist stripe 111 is smaller than the volume of the second color resist stripe 112, and the volume of the second color resist stripe 112 is smaller than the volume of the third color resist stripe 113. When the respective color resist stripes have substantially the same thickness and the respective color resist stripes have substantially the same width, the length of the first color resist stripe 111 is smaller than the length of the second color resist stripe 112, and the length of the second color resist stripe is smaller than the length of the third color resist stripe 113. The length described in this embodiment is an extending length of the respective color resist stripe in the Y direction.

Referring to FIG. 1 again, in the first embodiment of the invention, if the first color resist 101 is a green color resist, the second color resist 102 is a blue color resist, and the third color resist 103 is a red color resist, according to the characteristics of different color resist materials, when the volume of the first color resist stripe 111 is smaller than or equal to 270,000 µm3, and a thickness of the color resist layer is 2.85 µm, an area of the first color resist stripe 111 is smaller than or equal to 98,000 µm² in order to control an offset of the wrinkle of the color resist within a range of error margin.

In the manufacturing process of the display panel, the first color resist 101, the second color resist 102 and the third color resist 103 are formed as patterns on the second substrate 10 through a first mask plate, a second mask plate and a third mask plate. Specifically, the first mask plate comprises a first mask pattern for patterning and forming the first color resist stripes 111, the second mask plate comprises a second mask pattern for patterning and forming the second color resist stripes 112, and the third mask plate comprises a third mask pattern for patterning and forming the third color resist stripes 113. In this embodiment, the first color resist 101 is a green color resist, the second color resist 102 is a blue color resist, and the third color resist 103 is a red color resist. According to difference of characteristics of color resist materials, the volume (or area) of the first color resist stripe 111 is smaller than the volume (or area) of the second color resist stripe 112 and the volume (or area) of the third color resist stripe 113. In such a case, the mask pattern of the mask plate associated with the respective color resist is designed to have corresponding area, such that an area of the first mask pattern is relatively smaller. In this embodiment, according to a resolution of the corresponding display panel, each of the first mask pattern, the second mask pattern and the third mask pattern has a width between 20 to 60 µm in the first direction X. In this embodiment, the first mask pattern, the second mask pattern and the third mask pattern are designed as openings, but the invention is not limited thereto.

Figure 3:
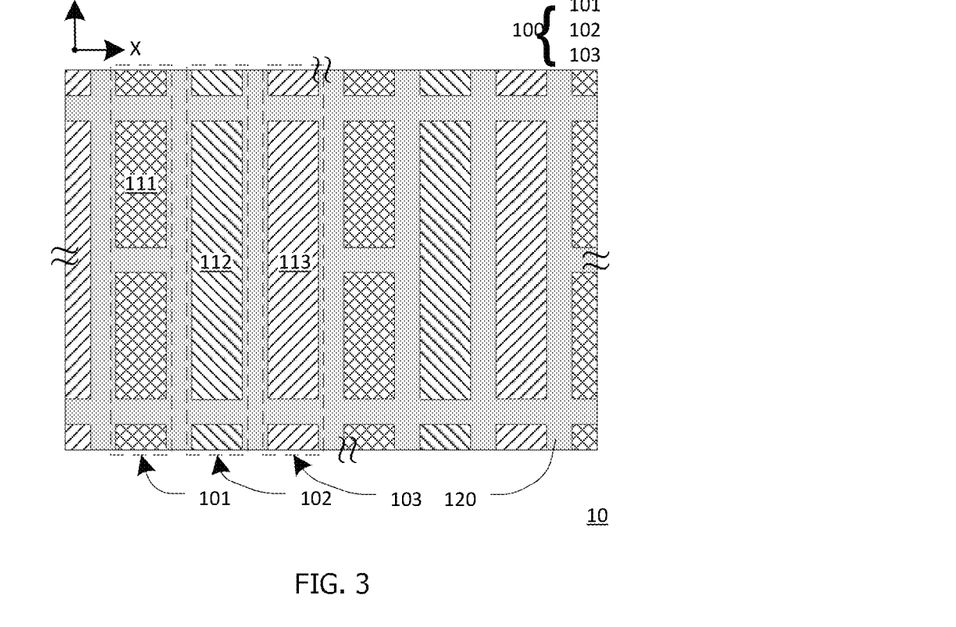
FIG. 3 is a top view of a color filter substrate of a display panel according to a second embodiment of the invention.

FIG. 3 is a top view of a color filter substrate of a display panel according to a second embodiment of the invention. As shown in FIG. 3, the second embodiment of the invention is substantially similar as the first embodiment, except for that in the Y direction, the first color resist 101 is divided into a plurality of first color resist stripes 111, the second color resist 102 is divided into a plurality of second color resist stripes 112, and the third color resist 103 is divided into a plurality of third color resist stripes 113; the number of the first color resist stripes 111 is larger than the number of the second color resist stripes 112, and the number of the second color resist stripes 112 is larger than the number of the third color resist stripes 113 in order to control an offset of the wrinkles of the color resists within a range of error margin; and when the first color resist 101 is a green color resist, the volume of the first color resist stripe 111 is smaller than or equal to 270,000 µm³. Specifically, the wrinkles are more likely to be formed on the surface of the green color resist due to the internal thermal stress, so the wrinkles on the surface can be reduced by forming the green color resist strip to have a volume smaller than or equal to 270,000 µm³. The volumes of the blue color resist strip and the red color resist strip can be substantially the same, and smaller than or equal to 290,000 µm³ in order to reduce the wrinkles on the surface of the blue or red color resist. The same mask can be used to pattern and form the blue and red color resists to reduce the manufacturing cost.

Figure 4A:
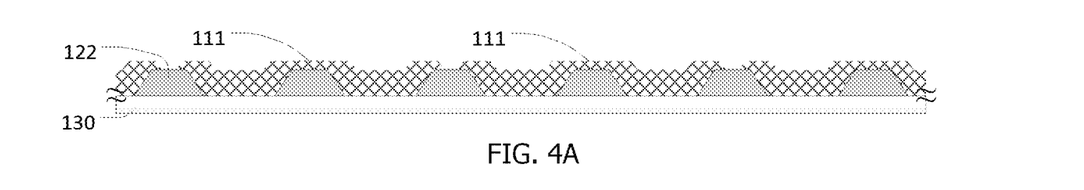
FIG. 4A is a sectional view of a first color resist along the Y direction in FIG. 3.
Figure 4B:
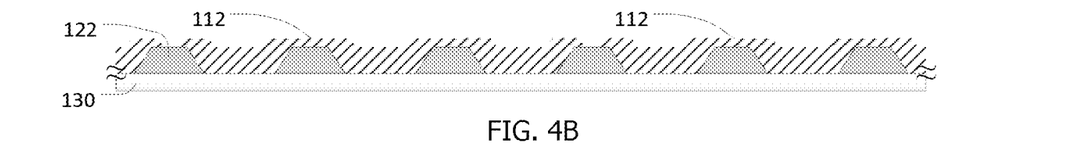
FIG. 4B is a sectional view of a second color resist along the Y direction in FIG. 3.
Figure 4C:
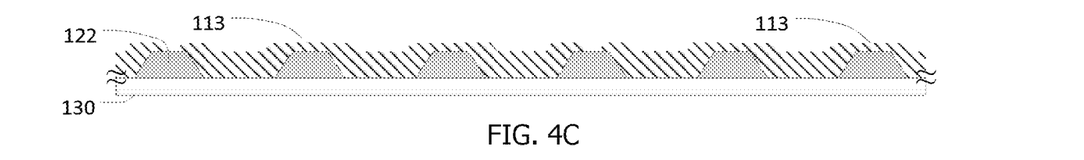
FIG. 4C is a sectional view of a third color resist along the Y direction in FIG. 3.

FIG. 4A is a sectional view of a first color resist along the Y direction in FIG. 3, FIG. 4B is a sectional view of a second color resist along the Y direction in FIG. 3, and FIG. 4C is a sectional view of a third color resist along the Y direction in FIG. 3. Since the sectional views along the X direction in the first embodiment and the second embodiment are same, the details are not repeated. Similar as the first embodiment, as shown in FIG. 4A, the first color resist 101 is formed on the substrate 130 by patterning the plurality of first color resist stripes 111; as shown in FIG. 4B, the second color resist 102 is formed on the substrate 130 by patterning the plurality of second color resist stripes 112; and as shown in FIG. 4C, the third color resist 103 is formed on the substrate 130 by patterning the plurality of third color resist stripes 113. In such a way, the volume of each of the first color resist stripe 111, the second color resist stripe 112 and the third color resist stripe 113 is smaller than the volume of the color resist formed as a single strip according to the prior art, thereby reducing the wrinkles formed on the surface of the color resist due to the internal thermal stress. As can be seen from FIG. 4B and FIG. 4C, the lengths of the second color resist stripe 112 and the third color resist stripe 113 are substantially the same, which not only reduces the wrinkles on the surface, but also reduces the cost by sharing the mask.

Referring to each of FIG. 3 and FIG. 4A to FIG. 4C, in this embodiment, in the Y direction, the length of the first color resist stripe 111 is smaller than the length of the second color resist stripe 112, and the length of the second color resist stripe 112 is equal to the length of the third color resist stripe 113. For example, the first color resist stripes 111 are green color resists, the second color resist stripes 112 are blue color resists, and the third color resist stripes 113 are red color resists. Specifically, since internal thermal stresses suffered or formed by different materials are different, in this embodiment, the volume of the green color resist is smaller than the volume of the blue color resist and the volume of the red color resist in order to avoid occurrence of the wrinkle. Therefore, as shown in FIG. 3, the volume of the first color resist stripe 111 is smaller than the volume of the second color resist stripe 112, and the volume of the second color resist stripe 112 is equal to the volume of the third color resist stripe 113. When the respective color resist stripes have substantially the same thickness and the respective color resist stripes have substantially the same width, the length of the first color resist stripe 111 is smaller than the length of the second color resist stripe 112, and the length of the second color resist stripe is equal to the length of the third color resist stripe 113.

Figure 5:
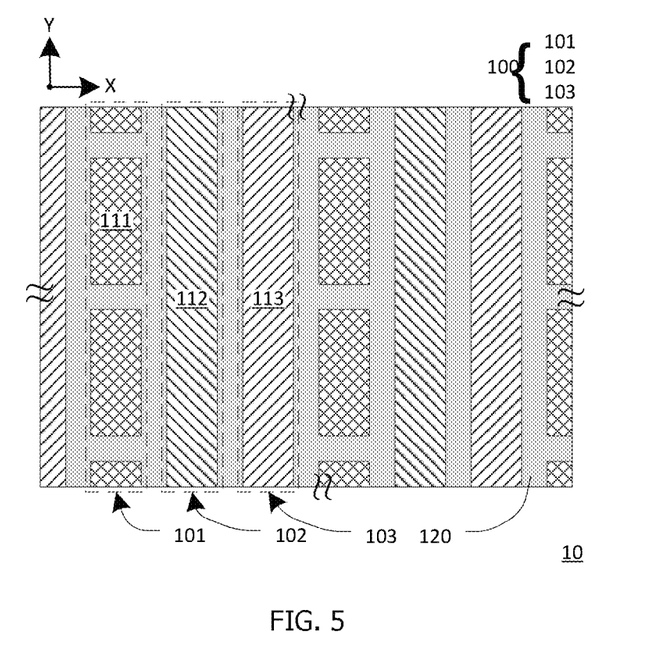
FIG. 5 is a top view of a color filter substrate of a display panel according to a third embodiment of the invention.

FIG. 5 is a top view of a color filter substrate of a display panel according to a third embodiment of the invention. As shown in FIG. 5, the third embodiment of the invention is substantially similar as the second embodiment, except for that in the Y direction, the first color resist 101 is divided into a plurality of first color resist stripes 111, the second color resist 102 is a single second color resist stripe 112, and the third color resist 103 is a single third color resist stripe 113, which is suitable for some products with a green color saturation (NTSC) of 100% and red and blue color saturation of 72%. In this embodiment, when the first color resist 101 is a green color resist, the second color resist 102 is a blue color resist, and the third color resist 103 is a red color resist, according to the characteristics of the different color resist material, the volume of the first color resist stripe 111 is smaller than or equal to 270,000 µm³, in order to control an offset of the wrinkles of the color resist within a range of error margin.

Figure 6A:
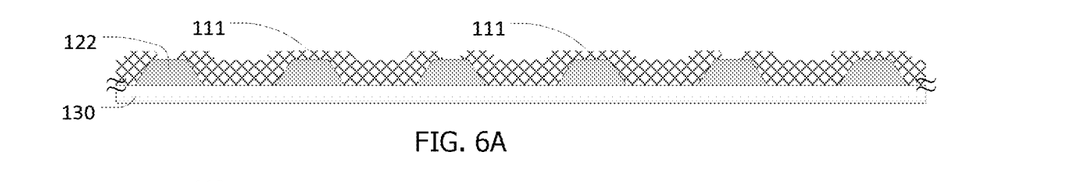
FIG. 6A is a sectional view of a first color resist along the Y direction in FIG. 5.
Figure 6B:
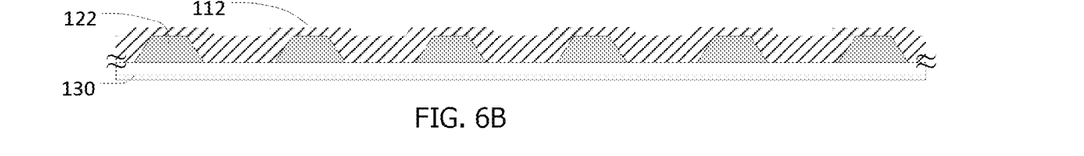
FIG. 6B is a sectional view of a second color resist along the Y direction in FIG. 5.
Figure 6C:
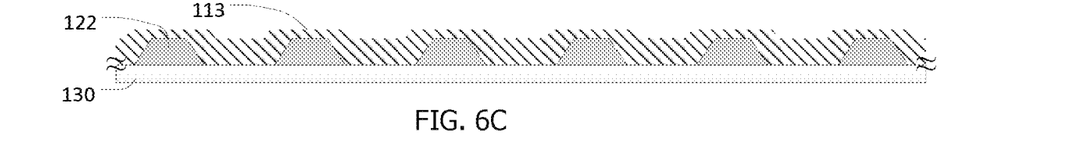
FIG. 6C is a sectional view of a third color resist along the Y direction in FIG. 5.

FIG. 6A is a sectional view of a first color resist along the Y direction in FIG. 5, FIG. 6B is a sectional view of a second color resist along the Y direction in FIG. 5, and FIG. 6C is a sectional view of a third color resist along the Y direction in FIG. 5. Similar as the first embodiment, as shown in FIG. 6A, the first color resist 101 is formed on the substrate 130 by patterning the plurality of first color resist stripes 111; as shown in FIG. 6B, the second color resist 102 is formed on the substrate 130 by patterning a single second color resist stripe 112, such that the volume of each of the second color resist stripes 112 is equal to the volume of the second color resist 102 formed as a single strip; and as shown in FIG. 6C, the third color resist 103 is formed on the substrate 130 by patterning a single third color resist stripe 113, such that the volume of each of the third color resist stripes 113 is equal to the third color resist 103 formed as a single strip.

Referring to FIG. 5 again, in the third embodiment of the invention, if the first color resist 101 is a green color resist, the second color resist 102 is a blue color resist, and the third color resist 103 is a red color resist, according to the characteristics of the different color resist materials, when the volume of the first color resist stripe 111 is smaller than or equal to 270,000 $\mu m^3$, and a thickness of the color resist layer is 2.85 $\mu m$, the area of the first color resist stripe 111 is smaller than or equal to 98,000 $\mu m^2$, in order to control an offset of the wrinkles of the color resist within a range of error margin. In this embodiment, the wrinkles are more likely to be formed on the surface of the green color resist due to the internal thermal stress, so the wrinkles on the surface can be reduced by forming the green color resist strip to have a volume smaller than or equal to 270,000 $\mu m^3$. The same mask can be used to pattern and form the blue and red color resists to reduce the manufacturing cost.

Figure 7:
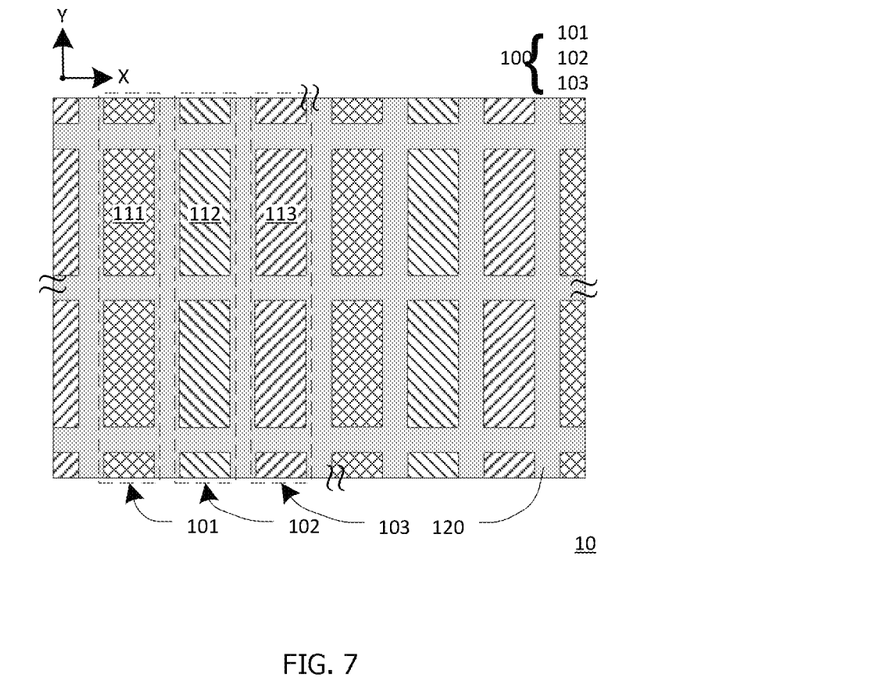
FIG. 7 is a top view of a color filter substrate of a display panel according to a fourth embodiment of the invention.

FIG. 7 is a top view of a color filter substrate of a display panel according to a fourth embodiment of the invention. As shown in FIG. 7, the fourth embodiment of the invention is substantially similar as the first embodiment, except for that in the Y direction, the first color resist 101 is divided into a plurality of first color resist stripes 111, the second color resist 102 is divided into a plurality of second color resist stripes 112, and the third color resist 103 is divided into a plurality of third color resist stripes 113; the numbers of the first color resist stripes 111, the second color resist stripes 112 and the third color resist stripes 113 are same, which is suitable for a product with all color saturation (NTSC), and a yield of the process is relatively high. Specifically, in this embodiment, the volumes of the first color resist stripe 111, the second color resist stripe 112 and the third color resist stripe 113 are substantially the same, and when the thicknesses are same, the areas of the first color resist stripe 111, the second color resist stripe 112 and the third color resist stripe 113 are substantially the same. Similarly, when the widths are same, the lengths of the first color resist stripe 111, the second color resist stripe 112 and the third color resist stripe 113 are substantially the same. In other words, the numbers of the first color resist stripes 111, the second color resist stripes 112 and the third color resist stripes 113 are same.

In this embodiment, when the color resists of the display panel are composed of the green, red and blue color resists, the wrinkles are more likely to be formed on the surface of the green color resist due to the internal thermal stress, so the wrinkles on the surface can be reduced by forming the color resist strip of each color resist to have a volume smaller than or equal to 270,000 $\mu m^3$. Therefore, in this embodiment, each color resist comprises a plurality of color resist stripes, and the volume of each color resist stripe (such as the first color resist stripe 111, the second color resist stripe 112 and the third color resist stripe 113) is substantially the same, and smaller than or equal to 270,000 $\mu m^3$. For example, when the volume of each color resist stripe is smaller than or equal to 270,000 $\mu m^3$, and a thickness of the color resist is 2.85 $\mu m$, the area of each color resist stripe is smaller than or equal to 98,000 $\mu m^2$.

Figure 8A:
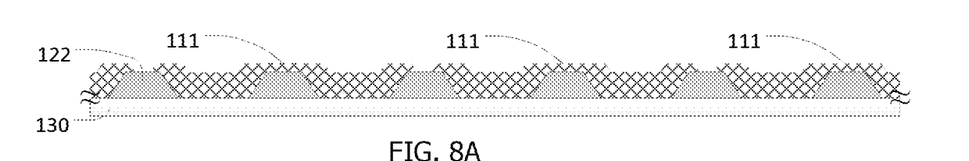
FIG. 8A is a sectional view of a first color resist along the Y direction in FIG. 7.
Figure 8B:
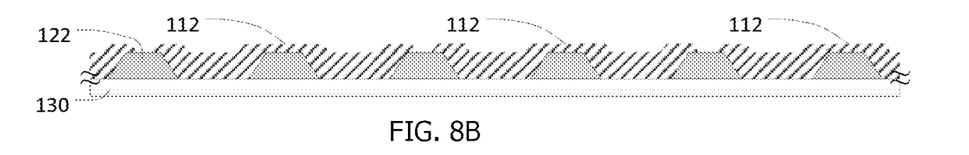
FIG. 8B is a sectional view of a second color resist along the Y direction in FIG. 7.
Figure 8C:
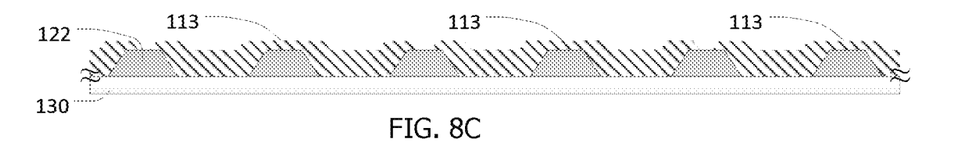
FIG. 8C is a sectional view of a third color resist along the Y direction in FIG. 7.

FIG. 8A is a sectional view of a first color resist along the Y direction in FIG. 7, FIG. 8B is a sectional view of a second color resist along the Y direction in FIG. 7, and FIG. 8C is a sectional view of a third color resist along the Y direction in FIG. 7. Similar as the first embodiment, as shown in FIG. 8A, the first color resist 101 is formed on the substrate 130 by patterning the plurality of first color resist stripes 111; as shown in FIG. 8B, the second color resist 102 is formed on the substrate 130 by patterning the plurality of second color resist stripes 112; and as shown in FIG. 8C, the third color resist 103 is formed on the substrate 130 by patterning the plurality of third color resist stripes 113. In such a way, as can be seen from FIG. 8A to FIG. 8C, the lengths of the first color resist stripe 111, the second color resist stripe 112 and the third color resist stripe 113 are substantially the same, so a same mask can be shared by the first color resist 101, the second color resist 102 and the third color resist 103 pattern and form respective color resist stripes, which can not only increase the yield, but also reduce the manufacturing cost.

Through the simulation tests for the color resists of the product with 100% NTSC, it can be found that wrinkles do not occur on the surface of the color resist film, or slight wrinkles having a flatness within a range of error margin (such as, a height offset of the slight wrinkle is smaller than 0.05 $\mu m$) occur on the surface of the color resist film. Specifically, when the color resist stripe of the green color resist has, for example, a width of 20 $\mu m$, wrinkles will not occur on the surface of the color resist strip if the length of the color resist stripe is 312 $\mu m$, slight wrinkles satisfying the error margin will occur on the surface of the color resist strip if the length of the color resist stripe is 4,732 $\mu m$, and severe wrinkles that deteriorate the quality of image will occur on the surface of the color resist strip if the length of the color resist stripe is equal to or larger than 39,052 $\mu m$. Table 1 shows the data of simulation tests, in which the color resist stripes applied to the display panels with different resolutions have widths of 20 $\mu m$, 30 $\mu m$, 40 $\mu m$, 50 $\mu m$, and 60 $\mu m$, respectively:

TABLE 1

Data of Simulation Test

| Width of color resist stripe ($\mu m$) | Length of color resist stripe ($\mu m$) | | | |
| --- | --- | --- | --- | --- |
| 20 | 312 | 4,732 | 39,052 | 51,272 |
| 30 | 208 | 3,155 | 26,035 | 34,181 |
| 40 | 156 | 2,366 | 19,526 | 25,636 |
| 50 | 125 | 1,893 | 15,621 | 20,509 |
| 60 | 104 | 1,577 | 13,017 | 17,091 |
| Area of color resist stripe ($\mu m^2$) | 6,190 | 93,757 | 773,689 | 1,015,786 |
| Volume of color resist stripe ($\mu m^3$) (the thickness is 2.85 $\mu m$) | 17,641 | 267,207 | 2,205,014 | 2,894,990 |
| Results of simulation tests | No wrinkle | Slight wrinkle | Severe wrinkle | Severe wrinkle |

As can be seen from Table 1, in the simulation tests, the widths of the different color resist stripes correspond to the lengths of the different color resist stripes to satisfy the requirement for the manufacturing process of the color filter substrate. When the area of the color resist stripe is smaller than 93,000 $\mu m^2$, and the volume of the color resist stripe is smaller than 260,000 $\mu m^3$ (the thickness of the color resist layer is 2.85 $\mu m$), the severe wrinkles can be prevented. Meanwhile, in the actual process, the volume or area of the color resist stripe patterned by using the same mask has a specific range of error. Therefore, the volume of the color resist stripe is required to be smaller than or equal to 260,000 $\mu m^3 \pm 10,000$ $\mu m^3$ (an error value of the volume) by adding the stimulation data of Table 1 with a value of the process error, such that the volume of the color resist stripe is required to be smaller than or equal to 270,000 $\mu m^3$, which has been explained above in each embodiment. Similarly, the area of the color resist stripe is required to be smaller than or equal to 93,000 $\mu m^2 \pm 5,000$ $\mu m^2$ (an error value of the area) by adding the stimulation data of Table 1 with a value of the process error, such that the area of the color resist stripe is required to be smaller than or equal to 98,000 $\mu m^2$, which has been explained above in each embodiment.

In this embodiment, Table 1 illustrates the results of the simulation tests for the green color resist. In practice, the wrinkles are more likely to be formed on the surface of the green color resist due to the internal thermal stress as compared to the blue color resist and the red color resist, and the wrinkles are more likely to be formed on the surface of the blue color resist due to the internal thermal stress as compared to the red color resist. In other words, the red color resist is least vulnerable to the wrinkles. Therefore, different color resists have different ranges of the volume (area) of the color resist stripe. For example, in the blue color resist, the volume of the blue color resist stripe is required to be smaller than or equal to 280,000 $\mu m^3 \pm 10,000$ $\mu m^3$ (an error value of the volume), such that the volume of the blue color resist stripe is required to be smaller than or equal to 290,000 $\mu m^3$. In the red color resist, the volume of the red color resist stripe is required to be smaller than or equal to 300,000 $\mu m^3 \pm 10,000$ $\mu m^3$ (an error value of the volume), such that the volume of the red color resist stripe is required to be smaller than or equal to 310,000 $\mu m^3$.

In the actual process, severe wrinkles occur on the surface of the green color resist, and relatively slight wrinkles occur on the surfaces of the blue color resist and the red color resist. Meanwhile, by considering the exposure accuracy, the areas and volumes of the color resist stripes for the green color resist, the blue color resist and the red color resist can be limited, respectively, or only the area and volume of the color resist stripe for the green color resist can be limited, according to the characteristics of different color resist materials.

Although the invention has been disclosed in the above embodiments, the invention is not limited thereto. Any persons skilled in the art can make equivalent modifications or variations without departing from the spirit and scope of the invention, and these modifications or variations shall be included in the scope defined by the appended claims.

INDUSTRIAL APPLICABILITY

According to the present invention, the area and volume of the color resist on the color filter substrate is changed in the process for manufacturing the color filter substrate by setting the area of the mask pattern of the mask plate group to reduce the difference between the crosslinking levels on the upper and lower surfaces of the color resist film caused by using the projection exposure machine, such that the wrinkles protruded from the surface of the color resist film and larger than the error margin are reduced to improve the yield of the product. The mask patterns are set for the respective color resist to be applied to the display panel having various color saturations, thereby increasing instability of the manufacturing process of the color filter substrate.

The invention claimed is:

1. A display panel, comprising:
   a first substrate;
   a second substrate comprising a color resist layer, the color resist layer comprising a first color resist, a second color resist and a third color resist sequentially arranged in a first direction; and
   a display molecular layer disposed between the first substrate and the second substrate;
   wherein, in a second direction perpendicular to the first direction, the first color resist comprises a plurality of first color resist stripes, the second color resist comprises at least one second color resist stripe, the third color resist comprises at least one third color resist stripe, and a volume of each of the plurality of first color resist stripes is smaller than a volume of the at least one second color resist stripe and smaller than a volume of the at least one third color resist stripe, wherein the first color resist is a green color resist;
   in the second direction, the at least one second color resist comprises a plurality of second color resist stripes, and the at least one third color resist comprises a plurality of third color resist stripes, wherein a number of the plurality of first color resist stripes is larger than a number of the plurality of second color resist stripes, and the number of the plurality of first color resist stripes is larger than a number of the plurality of third color resist stripes.

2. The display panel according to claim 1, wherein the volume of each of the plurality of first color resist stripe is smaller than or equal to 270,000 $\mu m^3$.

3. The display panel according to claim 2, wherein the second color resist is a blue color resist, and the volume of the at least one second color resist stripe is smaller than or equal to 290,000 $\mu m^3$.

4. The display panel according to claim 3, wherein the third color resist is a red color resist, and the volume of the at least one third color resist stripe is smaller than or equal to 310,000 $\mu m^3$.

5. The display panel according to claim 1, wherein an area of each of the plurality of first color resist stripe is smaller than or equal to 98,000 $\mu m^2$.

6. The display panel according to claim 1, wherein the volume of the at least one second color resist stripe is smaller than or equal to the volume of the at least one third color resist stripe, the second color resist is a blue color resist, and the third color resist is a red color resist.

7. The display panel according to claim 1, wherein the volume of the at least one second color resist stripe is smaller than or equal to the volume of the at least one third color resist stripe, the second color resist is a blue color resist, and the third color resist is a red color resist.

8. The display panel according to claim 1, further comprising a light shielding layer disposed on the second substrate and comprising a plurality of first light shielding stripes each extending in the first direction, and a plurality of second light shielding stripes each extending in the second direction and crossing with the first light shielding stripes, wherein the second light shielding stripes are positioned between the first color resist and the second color resist, between the second color resist and the third color resist, and between the third color resist and the first color resist, respectively.

9. The display panel according to claim 8, wherein a portion of the first light shielding stripes is completely covered by the first color resist, and a remaining portion of the first light shielding stripes is positioned between two adjacent first color resist stripes.

10. A mask plate group for manufacturing a display panel, the display panel comprising a first substrate, a second substrate and a display molecular layer disposed between the first substrate and the second substrate, wherein the second substrate comprises a color resist layer comprising a first color resist, a second color resist and a third color resist sequentially and uniformly arranged in a first direction, the first color resist comprises a plurality of first color resist stripes, the second color resist comprises at least one second color resist stripe, the third color resist comprises at least one third color resist stripe, and the first color resist is a green color resist;

the mask plate group comprises a first mask plate comprising a first mask pattern for patterning and forming the plurality of first color resist stripes, a second mask plate comprising a second mask pattern for patterning and forming the at least one second color resist stripe, and a third mask plate comprising a third mask pattern for patterning and forming the at least one third color resist strip;

wherein an area of the first mask pattern is smaller than an area of the second mask pattern, and the area of the first mask pattern is smaller than an area of the third mask pattern;

in the second direction, the at least one second color resist comprises a plurality of second color resist stripes, and the at least one third color resist comprises a plurality of third color resist stripes, wherein a number of the plurality of first color resist stripes is larger than a number of the plurality of second color resist stripes, and the number of the plurality of first color resist stripes is larger than a number of the plurality of third color resist stripes.

11. The mask plate group according to claim 10, wherein the area of the first mask pattern is smaller than or equal to 98,000 $\mu m^2$.

12. The mask plate group according to claim 10, wherein each of the first mask pattern, the second mask pattern and the third mask pattern has a width between 20 to 60 $\mu m$ in the first direction.

13. The mask plate group according to claim 10, wherein the area of the second mask pattern is smaller than or equal to the area of the third mask pattern, and the second color resist is a blue color resist.

14. The mask plate group according to claim 10, wherein each of the plurality of first color resist stripes formed by the first mask pattern has an area between 93,000±5,000 $\mu m^2$, the at least one second color resist stripe formed by the second mask pattern has an area between 95,000±5,000 $\mu m^2$, and the at least one third color resist stripe formed by the third mask pattern has an area between 97,000±5,000 $\mu m^2$.

15. The mask plate group according to claim 10, wherein each of the plurality of first color resist stripes formed by the first mask pattern has a volume between 260,000±10,000 $\mu m^3$, the at least one second color resist stripe formed by the second mask pattern has a volume between 280,000±10,000 $\mu m^3$, and the at least one third color resist stripe formed by the third mask pattern has a volume between 300,000±10,000 $\mu m^3$.

* * * * *